J. B. FLOYD.
COTTON GRADER.
APPLICATION FILED OCT. 5, 1912.

1,057,379.

Patented Mar. 25, 1913.

Witnesses
J. W. Cox
Norrie Welsh.

Inventor
John B. Floyd

By Potts Johnston
Attorney

COLUMBIA PLANOGRAPH CO., WASHINGTON, D. C.

UNITED STATES PATENT OFFICE.

JOHN B. FLOYD, OF BIRMINGHAM, ALABAMA, ASSIGNOR TO SOUTHERN STANDARD COTTON GRADER COMPANY, OF BIRMINGHAM, ALABAMA, A CORPORATION OF ALABAMA.

COTTON-GRADER.

1,057,379.  Specification of Letters Patent.  Patented Mar. 25, 1913.

Application filed October 5, 1912. Serial No. 724,164.

*To all whom it may concern:*

Be it known that I, JOHN B. FLOYD, a citizen of the United States of America, residing at Birmingham, in the county of Jefferson and State of Alabama, have invented certain new and useful Improvements in Cotton-Graders, of which the following is a specification.

My invention relates to a novel and effective apparatus for the purpose of grading samples of cotton and its object is to provide the most simple and effective means for displaying the standard grades in a glass covered casing in connection with a device for presenting the sample to be graded under a similar glass cover and at a point where the maximum quantity of the standard cotton is available for purposes of comparison.

My object, more specifically stated, is to provide a circular subdivided glass covered container for the standard samples of the different grades of cotton and I mount this for rotative movement with reference to a glass holding frame under which the sample to be graded is displayed and which stands close to the periphery of the circular casing.

My invention further comprises the details of construction and arrangement of parts hereinafter more particularly described and claimed, reference being had to the accompanying drawings, in which:—

Figure 1:
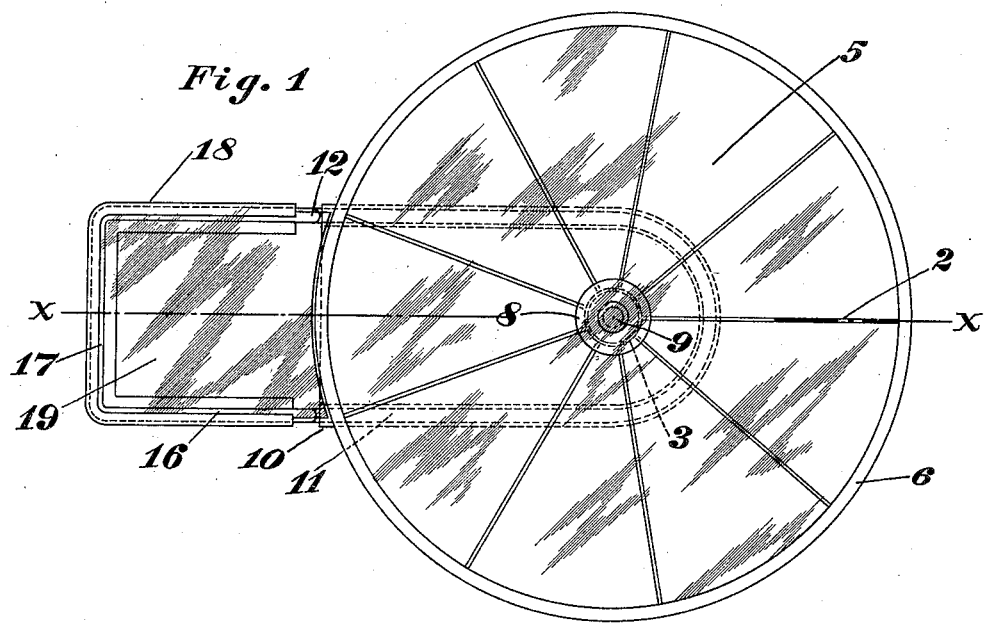
Figure 2:
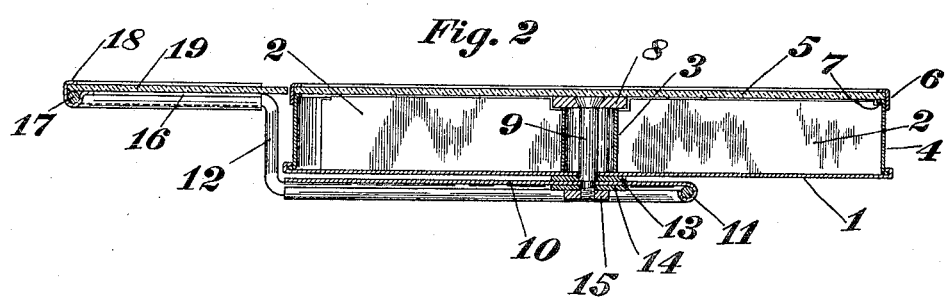

Figure 1 is a top plan view of the complete apparatus, and Fig. 2 is a longitudinal vertical cross-sectional view along the lines $x$—$x$ of Fig. 1.

Similar reference numerals refer to similar parts throughout the drawings.

In the preferred embodiment illustrated the container for the standard samples, with reference to which the grading is made, comprises a metallic casing 1 which is provided with a series of segmental pockets formed by radial partitions 2 which connect to the hub portion 3 and to the rim portion 4. The rim is shown circular which is its preferred form, but obviously it may be polygonal. The pockets thus formed are segmental and of uniform size, presenting the maximum extent of the cotton sample for comparison along their peripheral outer edges. A glass cover 5 extends completely over the container and is held by a metal clamp ring 6, against the flange portion 7, the ring being adapted to slip over and be welded, soldered, or otherwise fastened to the rim 4. The partitions 2 are notched at their upper inner ends where they join to the hub ring 3 and a washer 8 is adapted to seat upon the several partitions and ring 3 and receive in its center the countersunk head of a pivot bolt 9 which extends down through an opening in the bottom of the casing.

The device for displaying the sample to be graded comprises a bent wire frame, the lower portion of which receives a sheet metal plate 10, the edges of which are bent or crimped around the wire 11 which is arranged with parallel sides and a curved end which extends well beyond the center of the container when the latter is mounted thereon with its periphery in close running association with the upright portions 12 of the wire. The bolt 9 passes down through a washer 13 under the container and through a suitable opening in the metal plate 10 and through a washer 14, a nut 15 being screwed onto its threaded end and serving to hold the container rotatively mounted upon the wire frame. The portions 12 of the wire, after reaching a point level with the top of the peripheral wall 4 of the container, is bent outwardly in a horizontal plane to form two parallel side legs 16 which are joined at their outer ends by a portion 17 of the wire. The legs 16 and 17 have bent about them a metal strip 18, the ends of which are brought close together on the inside of the wire to form a receiver and holder for a glass 19 of the same character as the glass 5, which glass has its edge adjacent to the container struck on a curve from the center of the pivot bolt 9. The receiving pockets for this glass are open toward the container so that the glass 19 can be readily slipped into the receiving grooves before the container is mounted on the plate 10 and after it is so mounted it holds the glass 19 from slipping out. The glass cover over the container may be suitably marked to indicate the grade of the several samples of cotton displayed in the several compartments of the container so that, when the apparatus is in use, the sample of cotton to be graded is presented below the glass 19 and the container is revolved so that it successively presents the different standard samples for comparison with the sample to be graded with the result that the grading may be very rapidly and effectively performed. By presenting the sample to be graded adjacent to the peripheral wall of the segmental pocket, I am enabled to reduce to a minimum the size of the container and yet to present a maximum quantity of the standard samples for comparison with the sample to be graded.

Having thus described my invention, what I claim as new and desire to secure by Letters Patent, is:—

1. In a cotton grader, a container subdivided into separate compartments which are open above, a transparent cover for the container, a transparent plate, means to support said plate adjacent to the outer edge of said container, and means to connect the holder and container for relative rotary movement, substantially as described.

2. In combination, a circular open topped container, a glass cover fastened over said container, radial partitions within the container which subdivide it into separate compartments adapted to receive grading samples of cotton, a base, means to pivotally connect the container to the base, uprights connected to the base, and a sheet of glass connected to said uprights and disposed substantially level with and adjacent to the glass cover on the container, substantially as described.

3. In combination, a bent wire frame comprising a base portion, a metal plate fastened to the base portion, a raised top portion, a glass plate secured in said top portion, a rotary container pivoted to said plate, a glass top for said container, and means to subdivide the container into different compartments, said glass in the upper portion of the frame having its edge adjacent to the container and curved to conform substantially to the curvature of the periphery of the container, substantially as described.

In testimony whereof I affix my signature in presence of two witnesses.

JOHN B. FLOYD.

Witnesses:
  W. H. GILLESPIE,
  NOMIE WELSH.

Copies of this patent may be obtained for five cents each, by addressing the "Commissioner of Patents, Washington, D. C."